No. 816,733. PATENTED APR. 3, 1906.
D. McDONALD.
HORSE HOOF CUTTER.
APPLICATION FILED JUNE 3, 1905.
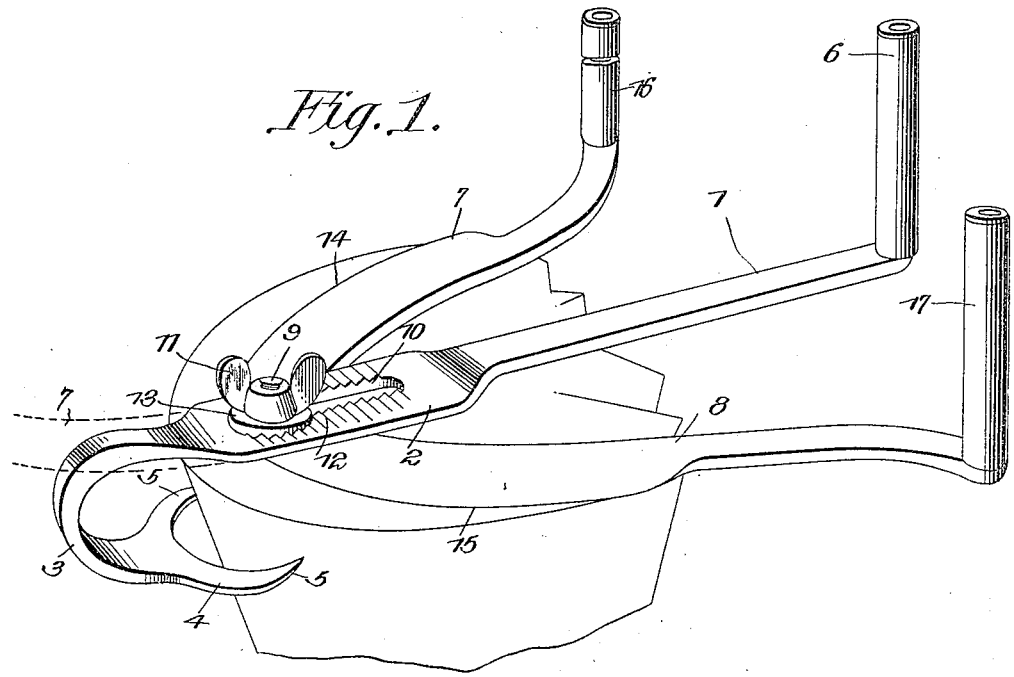
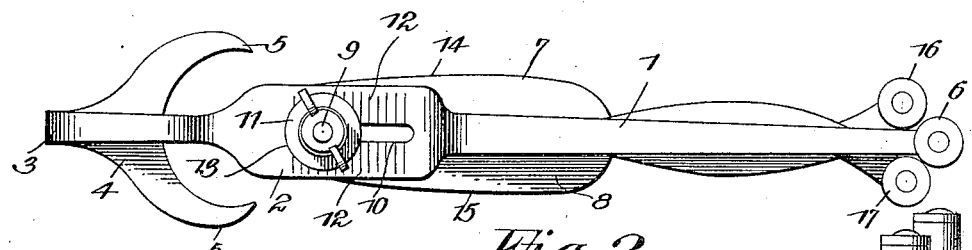
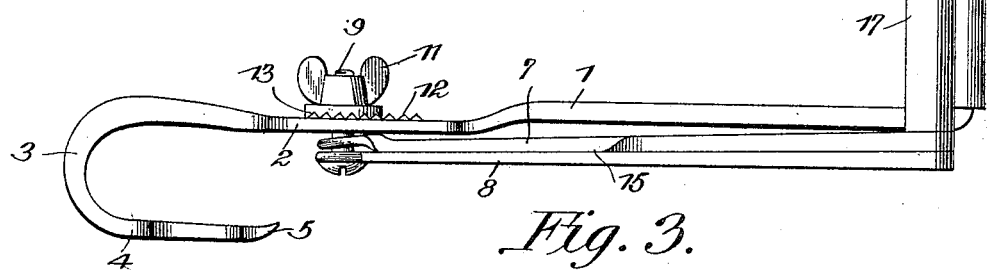
Witnesses
Duncan McDonald, Inventor
by C. A. Snow & Co.
Attorneys

UNITED STATES PATENT OFFICE.

DUNCAN McDONALD, OF CAPE NORTH, CANADA.

HORSE-HOOF CUTTER.

No. 816,733.     Specification of Letters Patent.     Patented April 3, 1906.

Application filed June 3, 1905. Serial No. 263,643.

*To all whom it may concern:*

Be it known that I, DUNCAN MCDONALD, a subject of the King of Great Britain, residing at Cape North, in the county of Victoria, Province of Nova Scotia, and Dominion of Canada, have invented a new and useful Horse-Hoof Cutter, of which the following is a specification.

My invention relates to devices for trimming or paring hoofs, and has for its objects to produce a device of this character which will be simple of construction, inexpensive to manufacture, one which may be readily manipulated, and one which in practice insures a more uniform and even paring of the hoof than is attainable by prior analogous devices and at the same time admits of the paring operation being performed more quickly and efficiently than heretofore.

To these ends the invention comprises the novel details of construction and combination of parts more fully hereinafter described.

In the accompanying drawings, Figure 1 is a perspective view illustrating the device in operation upon a hoof. Fig. 2 is a top plan view of the device in its closed position. Fig. 3 is a side elevation of the same.

Referring to the drawings, 1 indicates a main bar or member which has an enlarged flat bearing portion 2 and a reduced downwardly-curved neck 3, provided with a bifurcated head 4, having integral hoof-engaging fingers 5. The inner end of the member is reduced and bent at right angles to form a spindle which receives a handle 6.

7 and 8 indicate a pair of paring knives or members which are pivoted at their inner ends to the main member by means of a vertical bolt 9, passed through perforations in the ends of the members and upward through a slot 10, formed longitudinally of the bearing portion 2 of the member. The head of the bolt lies beneath the lower blade, and its shank, which projects above the member 1, receives a wing-nut 11. The upper face of the bearing portion 2 of the main member is provided at opposite sides of the slot 10 with transversely-disposed teeth or indentations 12, which engage with similar teeth formed on the under face of a washer 13, which is interposed between the wing-nut and the member. By this construction the blades 7 and 8 are adapted for adjustment longitudinally of the member 1 to adapt the device for operation upon hoofs of varying sizes, and when properly adjusted accidental disarrangement of the parts is obviated by the interengagement of the teeth on the washer and member, as will be readily understood. The paring-knives, which are composed, preferably, of cast-steel, are formed with outer cutting edges 14 15, which are reversely curved, as shown, whereby they will when operating upon the hoof pare the same with an outward shearing cut which insures a smooth even trimming of the hoof-shell and obviates liability of chipping or marring the outer edge of the same and with reduced inner portions which are bent upward at right angles to form spindles for the reception of rotatable handles 16 17.

In operation, supposing the device to be in position upon the hoof of an animal, as illustrated in Fig. 1, with the fingers 5 engaging the front of the same, the member 1 will extend centrally and longitudinally of the hoof. With the parts in this position the operator with one hand grasps the handles 6 and 16 and holds the same firmly, while with the other hand he grasps handle 17 and swings the knife 7 upon its pivot to the position indicated by dotted lines, thus with one stroke paring the right side of the hoof from the heel to the center of the toe. The knife 7 is then swung back to normal position and its handle 17 and handle 6 are held by the operator with one hand, while with the other hand he grasps handle 16 and swings knife 8 on its pivot in a manner similar to that just described in connection with knife 7, thus with one stroke paring the other side of the hoof from the heel to the center of the toe. In this connection it is to be noted that, owing to the fingers 5 engaging the hoof at its toe and the fact that the operator while manipulating the device grasps the handle 6, all liability of the device slipping is obviated and a smooth even trimming of the hoof-shell is insured and, further, that a uniform paring of the hoof is attendant upon the trimming of each half of the hoof with a single sweeping cut.

From the foregoing it will be seen that I produce a device which is at once simple of construction and efficient in operation and one which is admirably adapted for the attainment of the ends in view; but it is to be understood that I do not limit or confine myself to the details herein shown and described, inasmuch as various minor changes may be made therein without departing from the spirit or scope of my invention.

Having thus described my invention, what I claim is—

1. A device of the class described comprising a main bar or member provided with hoof-engaging devices, a pair of trimming-knives pivotally associated with the member and provided with operating-handles, and means for adjusting the knives longitudinally of the member.

2. A device of the class described comprising a main bar or member provided with hoof-engaging devices and a longitudinal slot, a pivoting-bolt adjustable in the slot, and having means for securing it at the desired adjustment, and a pair of trimming-knives pivoted upon the bolt and provided with operating-handles.

3. A device of the class described comprising a main bar or member provided with hoof-engaging devices and a longitudinal slot, a pivoting-bolt seated in the slot and provided with a clamping-nut, a pair of trimming-knives pivoted upon the bolt and provided with operating-handles, and a washer interposed between the nut and member and provided with teeth for engaging coöperating teeth formed on the member.

In testimony that I claim the foregoing as my own I have hereto affixed my signature in the presence of two witnesses.

DUNCAN McDONALD.

Witnesses:
PETER KERR,
ANGUS R. McDONALD.